Dec. 29, 1931.  E. H. BUNCE  1,838,296
REDUCTION OF ZINCIFEROUS MATERIALS
Filed Aug. 8, 1928  2 Sheets-Sheet 2
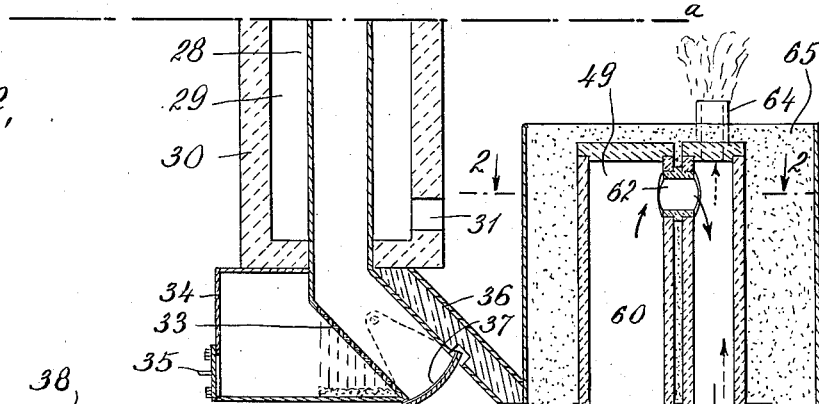
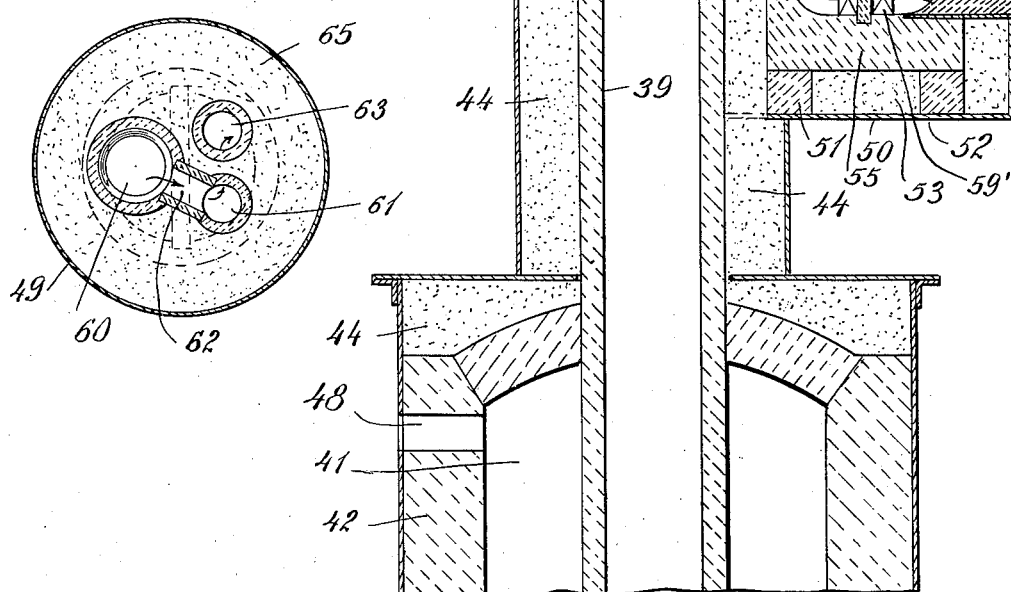
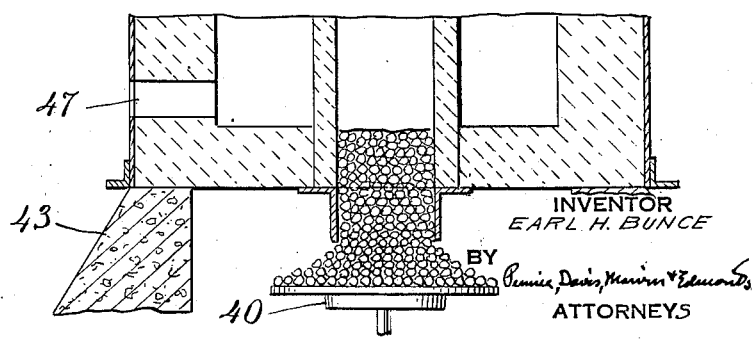
INVENTOR
EARL H. BUNCE
ATTORNEYS Patented Dec. 29, 1931

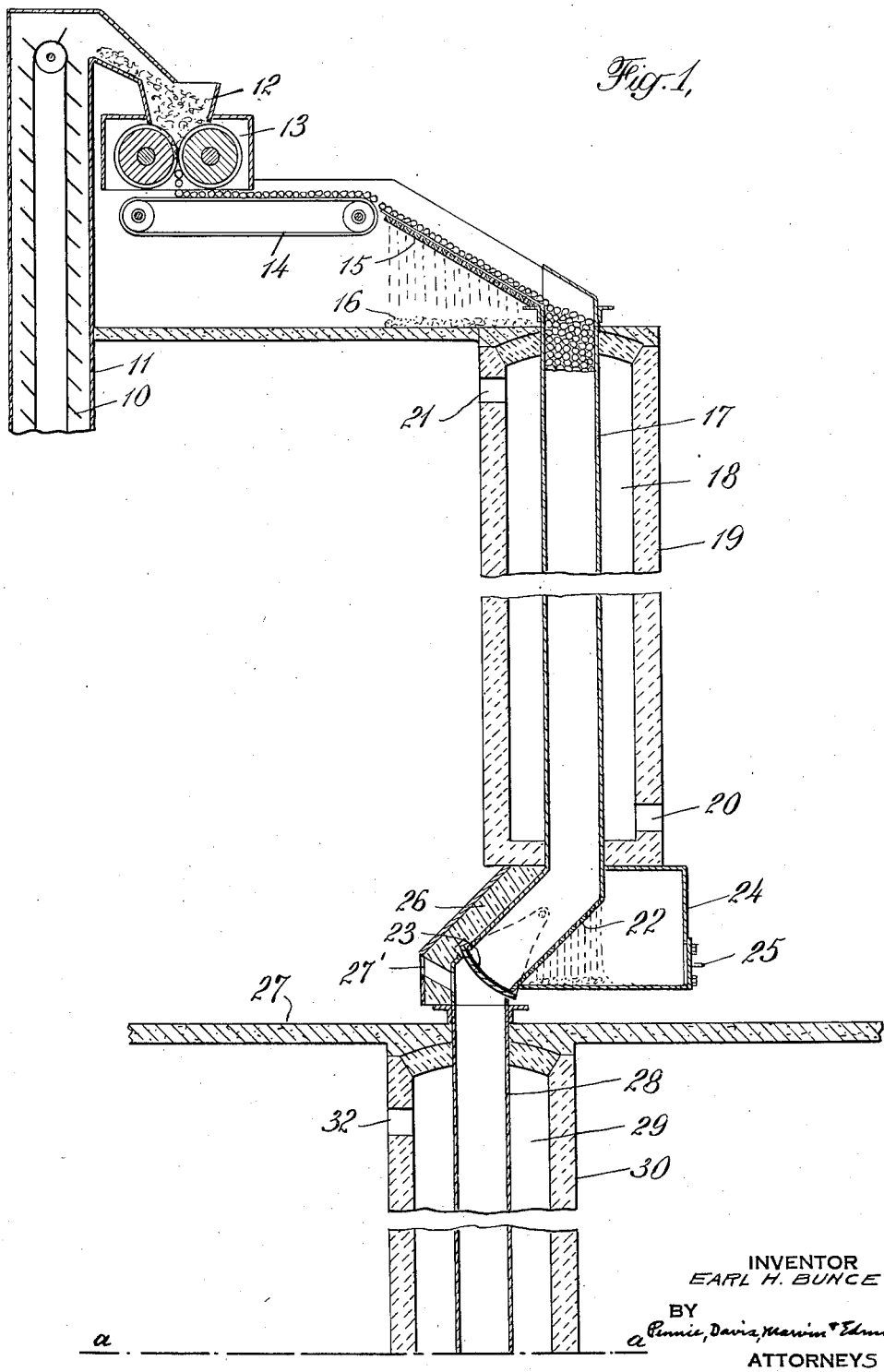

1,838,296

UNITED STATES PATENT OFFICE

EARL H. BUNCE, OF PALMERTON, PENNSYLVANIA, ASSIGNOR TO THE NEW JERSEY ZINC COMPANY, OF NEW YORK, N. Y., A CORPORATION OF NEW JERSEY

REDUCTION OF ZINCIFEROUS MATERIALS

Application filed August 8, 1928. Serial No. 298,186.

This invention relates to the reduction of zinciferous materials and has for its object the provision of improvements in the reduction of zinciferous materials.

Various proposals have been made from time to time to prepare and reduce zinciferous materials. Charge materials have been subjected to numerous preliminary treatment steps, prior to the zinc reduction operation. Thus, loose charges of various make-ups have been used. They are usually intimate mixtures of zinc ores and finely divided coal or coke. Such loose charges have been fed to horizontal as well as to vertical or upright reduction chambers, directly or indirectly heated.

Agglomerated or briquetted charges have also been proposed notably for use in the Wetherill type of furnace for the production of so-called American process zinc oxide, as well as for use in various reduction chambers for the manufacture of zinc metal or spelter, as well as zinc dust, including horizontal and vertical or upright retorts.

In the manufacture of zinc products as heretofore more commonly practiced, the process has been rather broken up. That is to say, the charge is suitably worked up at one place and is then transferred to another place for the zinc reduction operation. Not only the time but the distance between the preparation of the charge and its reduction is frequently and relatively at great intervals. Thus, the charge may be prepared days before it is to be subjected to a reduction operation, or the distance to be traversed by the prepared charge before reduction is so great as to require special transporting and charging devices.

Thus, in the case of the use of agglomerates or briquettes in vertical retorts, the agglomerates are frequently prepared one day and used on another day. Moreover, the prepared agglomerates may be both pressed and dried or baked, to strengthen the agglomerates, in different apparatus located some distance apart, and perhaps on the same or different levels. Not only does the preparation of the agglomerated charge prior to reduction require considerable labor and time, but if the dried or baked agglomerates are allowed to cool before reduction, considerable heat energy is wasted. Moreover, the agglomerates are subjected to considerable handling before they are actually subjected to the reduction operation, such as shoveling and dumping them from one place or receptacle to another. This rough treatment of the agglomerates tends to effect their disintegration at least in part with the result that an objectionable amount of fines is produced. No efficient process or device appears to have been proposed for the efficient and economical reduction of agglomerated zinciferous materials, so that the raw materials going into the charge may be suitably and directly continued from the agglomerating step to and through the final reduction operation, not to mention other intermediary steps, with a minimum of time and expense.

In the practice of the present invention, it is possible economically and efficiently to effect the reduction of zinciferous materials by progressively and substantially continuously moving the raw materials going into the charge from the agglomerating stage to the withdrawal of the spent residues at the end of the reduction operation.

According to the present invention, a method and apparatus are provided for reducing zinciferous materials which comprises agglomerating a mixture of zinciferous material and carbonaceous reducing agent, conveying the freshly formed agglomerates without substantial drops or falls to a preheating chamber, preheating the agglomerates in the form of a porous charge at some suitable temperature below the reduction point of the zinc compounds, conveying the preheated agglomerates by gravity to a reduction chamber, and supplying heat to the porous agglomerated charge in the course of its passage through such reduction chamber at a temperature level adapted to reduce the compounds of zinc and volatilize the resulting metallic zinc. The movement of the agglomerates is effected for the most part by the action of gravity.

While the mere formation and reduction of an agglomerated charge of mixed zinciferous material and carbonaceous reducing agent may now be considered relatively and broadly easy steps, other steps may be frequently involved—depending on the character of the raw materials employed, and the condition in which it is desired to have the agglomerates during the zinc reduction operation, which materially influence and affect the matter of handling agglomerates. In order to strengthen agglomerates, it is, of course, generally desired to dry or bake the freshly formed agglomerates.

Should the zinciferous material, for example, going into the charge of agglomerates be unduly contaminated with objectionable impurities, such as gangue carbonates and/or cadmium and the like, they should be substantially eliminated before the charge is subjected to the zinc reduction operation in order to obtain relatively pure zinc products. In the case of cadmium, no practicable method yet appears to have been publicly advanced to eliminate the same from zinciferous materials. The presence of gangue carbonates in zinciferous material is objectionable because they produce carbon dioxide gas when heated to a sufficiently high temperature, which is below the reduction temperature of zinc compounds. When carbon dioxide gases accompany the zinc vapor leaving the reduction chamber, the condensation of the vapor to zinc metal is seriously impaired because of the oxidizing effect of the carbon dioxide. Furthermore, the dilution of the zinc vapor by the carbon monoxide tends to interfere with the condensation. The droplets of zinc vapor formed in the condenser become coated with a film of zinc oxide. These films of oxide tend to keep the zinc droplets from merging or coalescing with one another, and hence retard the collection of a body of liquid zinc within the condenser which is necessary in the production of zinc metal or spelter. In the copending application of Messrs. Bunce and Mahler Serial No. 298,185, filed August 8, 1928, there is disclosed a method and apparatus for eliminating cadmium and/or breaking down gangue carbonates in the reduction of zinciferous materials. The practice of the invention therein disclosed, which comprises substantially uniformly heating an agglomerated charge of the zinciferous material mixed with carbonaceous reducing agent at a suitable temperature level below the reduction temperature of the zinc compounds, may very well constitute one of the intermediate steps in the practice of the present invention.

In some instances it may be desired to use a charge of coked agglomerates composed of a mixture of zinciferous material and carbonaceous reducing agent, in vertical or upright retorts. Instead of subjecting the agglomerates to a coking operation in one furnace or retort, and then withdrawing the hot charge of coked agglomerates to be employed in the zinc reduction operation at a later time or in a reduction chamber somewhat removed from the coking furnace, during which interval the hot charge is cooled and takes up objectionable atmospheric oxygen, both the coking and the reduction operations may be conducted in a substantially continuous manner in accordance with the practice of the present invention.

The zinc reduction operation may be conducted in any suitable type of vertical or upright retort, directly and/or indirectly heated. The agglomerates may with advantage be reduced according to the practice disclosed in the copending application of Messrs. Breyer and Bunce, Serial No. 163,902, filed January 27, 1927, according to which a porous charge of agglomerates of mixed zinciferous material and carbonaceous reducing agent is progressively passed through a vertical or upright retort without substantial breaking down of the agglomerates during their passage through the retort, heating the agglomerates in the course of such passage to a sufficiently high temperature to reduce compounds of zinc and to liberate metallic zinc vapor without slagging or fusing the agglomerated charge, and withdrawing from the retort a gaseous product containing metallic zinc vapor capable of being directly and economically converted to zinc metal or spelter, zinc oxide, zinc dust, etc.

Should the zinciferous material employed in the preparation of the agglomerates contain appreciable amounts of lead as an objectionable impurity, the practice disclosed in the copending application of Messrs. Bunce and Mahler, Serial No. 244,519, filed January 4, 1928 (which has since issued into United States Patent No. 1,749,127 of March 4, 1930) may be resorted to as a step in the practice of the present invention. According to said copending application such an agglomerated charge is subjected to a reduction operation in a vertical or upright retort, the gaseous-vapor product of the reducing operation is conducted through a body of fresh agglomerates about to be subjected to the reducing operation and maintained at a temperature level sufficiently low to effect substantial removal of lead from the gaseous-vapor product without condensing any substantial amount of zinc vapor, and subjecting the thus de-leaded gaseous product to appropriate treatment for the recovery of the zinc content thereof.

These and other specific features of the invention will be better understood by referring to the accompanying drawings, taken in conjunction with the following description, in which:

Figs. 1 and 2 represent in a diagrammatic way an apparatus adapted to practice the invention. The apparatus shown in Fig. 2 is a continuation of the apparatus shown in Fig. 1, as indicated by the division line a—a. Fig. 3 is a section on the line 2—2 of Fig. 2.

In Fig. 1 there is illustrated an elevator 10 within an encasement 11 for transporting loose charge material of mixed zinciferous material and carbonaceous reducing agent into a feed hopper 12, located above an agglomerating or briquetting press 13. A belt conveyor 14 is located beneath the agglomerating press for conducting the agglomerates without substantial drops or falls to an inclined screening device or grizzly 15. Instead of using a moving conveyor, an inclined screening device or grizzly may be extended directly beneath the press. A platform or floor 16 is adapted to support the agglomerating press and the belt conveyor, as well as to catch fines that may drop down through the inclined screening device or grizzly.

A vertical drying chamber or retort 17, which may be constructed of wrought iron, within a heating chamber or laboratory 18 enclosed with a furnace wall structure 19, which may be constructed of suitable refractory brick, joins at its upper end with the inclined screening device or grizzly 15 in such manner as to receive the agglomerates without substantial drops or falls, when the drying chamber is filled with agglomerates. The drying chamber is at a level sufficiently below the agglomerating press so that the agglomerates may slide by gravity down the inclined screening device, but with little or no relative movement one to another. A port 20 at the lower end of the furnace structure 19 is adapted to receive heating gases to be circulated within the heating chamber 18. A port 21 is located near the top of the furnace structure 19 for the exit of spent heating gases.

The bottom of the drying chamber or retort 17 meets with an inclined screening device or grizzly 22 provided with a discharge swing gate 23 attached to its lower or discharge outlet. The inclined screening device is in turn appropriately surrounded by an encasement 24 provided with a door 25 for the removal of fines falling through the screen. A layer of heat insulating material 26 is provided above the inclined screening device.

The drying chamber or retort 17, together with its accompanying furnace wall structure, and the inclined screening device or grizzly 22, together with its accompanying structure, is appropriately supported on a platform or floor 27.

A second vertical heating chamber or retort 28, which may be constructed of wrought iron, located at a lower level, connects at its upper end with the inclined screening device 22. It is suitably located within a heating chamber or laboratory 29 confined by a furnace structure 30 which may be constructed of suitable refractory brick. A port 31 is provided in the lower part of the furnace structure 30 for the introduction of heating gases into the heating chamber or laboratory 29. A port 32 is provided in the furnace structure near its upper end for the exit of spent heating gases. A port 27' is also preferably located near the upper end of the retort 28 for the escape of volatile constituents.

An inclined screening device or grizzly 33 connects with the lowermost end of the heating chamber or retort 28. It is enclosed in a casing 34 provided with a door 35 for the removal of fines. A layer of heat insulating material 36 is provided above the screening device. A discharge swing gate 37 is attached to the inclined screening device and is adapted to be swung in a position to discharge accumulating agglomerates from time to time.

The heating chamber or retort 28 and the inclined screening device 33, together with their accompanying structures, are appropriately supported on the platform or floor 38.

A vertical zinc reduction chamber or retort 39, which may advantageously be constructed of silicon carbide refractory material, located at a lower level, connects at its upper end with the discharge end of the inclined screening device 33 and at its lower end with a revolving discharge table 40 for the removal of spent agglomerates or residues. The retort 39 is appropriately located within a heating chamber or laboratory 41, confined by a furnace structure 42, which may be appropriately constructed of heat refractory brick. This furnace structure is in turn supported by foundations 43. The top of the furnace structure 42 is covered with heat insulating material 44. The upper end of the retort 39 is provided with a deflecting plate 45, to prevent freshly charged agglomerates from falling into a gas-vapor discharge outlet 46. A port 47 is provided near the bottom of the furnace structure 42 for the introduction of heating gases that are to circulate within the heating chamber or laboratory 41. A port 48 is provided near the upper end of the furnace structure for the exit of spent heating gases. Provision may be made for a recuperator (not shown) to be used in conjunction with this retort in order to recuperate heat from the gases leaving port 48. The upper end of the retort preferably extends some distance above the heating chamber or laboratory 41, particularly when it is desired to subject zinc vapor leaving the retort to a de-leading operation. This end of the retort is appropriately insulated.

A discharge outlet 46 in the retort 39 is connected with a fractionating condenser 49 for the condensation of zinc vapor to different grades of zinc metal or spelter. The condensing device is supported on a platform 50. The condenser itself rests on brick pillars 51 and 52, the space between them being filled with dust coal 53. The condenser is provided with two separate sumps or reservoirs 54 and 54' which are in turn surrounded by a carbon or refractory pot 55 provided with clean-out ports 56 and 57, normally closed, for the withdrawal of refuse material. A separating wall member 58, divides the condenser into two main chambers for the accumulation of different grades of molten zinc. Ports 59 and 59' are provided for the withdrawal of molten zinc from each sump or reservoir. The upper end of the condensing device is equipped with a circulating passageway 60 consisting of a refractory tube, which in turn connects with a downdraft passageway 61, connected at its upper end with the opening and passage 62. The passageway 61 leads down to the second sump or reservoir 54'. An adjoining circulating passageway 63, open at both ends, is adapted to receive the tail gases and vapors. An exit tube 64 leads to the open atmosphere. The whole condensing apparatus for the most part is enclosed with an insulating layer of dust coal 65 to keep the condenser hot.

The operation of the above described apparatus may be conducted as follows: A suitable mixture of loose zinciferous material and carbonaceous reducing agent is lifted by the elevator 10 to the feed hopper 12. From thence the loose charge material is passed through the agglomerating device or press 13, from which agglomerates are gently dropped to the belt conveyor 14. This belt conveyor transports the agglomerates to the inclined screening device or grizzly 15, down which agglomerates slide with substantially no relative movement one to another. Whatever fines pass through the agglomerating device or press 13 fall through the screening device onto the floor 16.

The agglomerates are then conducted into the drying chamber 17 until the same is filled. Suitable heating gases are conducted into the heating chamber or laboratory 18 through the inlet port 20. The spent heating gases are exited through the port 21. The temperature of the heating gases may be so controlled as to only dry the agglomerates, or the temperature may be increased to subject the agglomerates to a substantial baking action in order to harden and toughen them.

The agglomerates are then passed through the lower end of the drying chamber 17, and are conducted by gravity over the inclined screening device or grizzly 22, through which any fines formed in the drying chamber are passed and deposited within the closed encasement 24.

When it is desired to introduce agglomerates into the heating chamber 28, the discharge swing gate 23 is opened. The agglomerates are subjected to higher temperature levels in this retort for various reasons. Should the zinciferous material employed in the charge be contaminated with gangue carbonates and/or cadmium, the agglomerates may be heated at a suitable elevated temperature level not only to reduce the compounds of cadmium, and to liberate metallic cadmium vapor, but to break up the gangue carbonates into their metallic oxides and carbon dioxide gas. Such cadimum vapor and/or carbon dioxide gas together with other gaseous products may be allowed to escape through the port 27'. A suitable device (not shown) may be attached to the port 27' to recover the cadmium vapor. If it is desired to coke the agglomerates within the retort 28, they may be subjected to an appropriate coking temperature. Such volatile constituents as are evolved may be allowed to escape through the port 27', or this port may be closed and the swing gate 23 sufficiently opened to allow the heated volatile constituents to pass on through the agglomerates in the drying chamber or retort 17.

The discharge swing gate 37 may be opened from time to time for the purpose of conducting such preliminarily treated agglomerates to the main zinc reduction chamber or retort 39. Whatever fines are formed during the preliminary treatment operation are permitted to fall down through the inclined screening device or grizzly 33. Heating gases are introduced through the port 47, and, after a substantial part of the heat has been dissipated, the spent gases are exited through the port 48. The spent agglomerates or residues may be withdrawn from time to time, or substantially continuously, by means of the revolving discharge table 40. During the reduction operation the zinc compounds are reduced and metallic zinc vapor is liberated. The zinc vapor tends to rise upwardly, and makes its exit through the discharge outlet 46 into the condenser 49. In case the zinciferous material employed in the charge is contaminated with lead, the agglomerates in the portion of the retort 39 that projects above the laboratory or heating chamber 41 remove any lead carried by the retort gases, so that the zinc vapor enters the condenser substantially lead-free.

On coming into the condenser, the zinc vapor circulates up through the passageway 60, winds its course through the opening and passage 62, and then wends its way along the down-draft passageway 61, only to rise through the open-ended passageway 63. While traversing the condenser, the zinc vapor comes in contact with a large area of condenser wall, covered with a film of molten zinc. At the same time zinc droplets merge or coalesce with one another to drop down into the liquid bath of zinc collecting in the sumps or reservoirs 54 and 54'. The condensing action is aided by the maintenance on the condenser walls of a film of molten zinc. The condenser is suitably insulated against an undue loss of heat by radiation and conduction so that the condenser may be maintained at a temperature best adapted to effect the most efficient and thorough condensation of all, or substantially all, the available zinc vapor. The temperature of the two reservoirs 54 and 54' and of the corresponding passageways may be so regulated as to secure fractional condensation if impurities, such as lead and cadmium, as disclosed in copending application Ser. No. 303,036, filed August 30, 1928. The spent gases make their exit through the exit tube 64.

It will thus be seen that the agglomerates may be conducted from the agglomerate forming stage to and through the reduction stage, not to mention all the intermediary stages, in a substantially straight line flow by the action of gravity. Moreover, the progression of the charge may be handled in such manner as to clean it of fines before each heat treatment stage. Any or all of the preliminary heat treatment stages prior to reduction for zinc may be broadly referred to as preheating. The practice of the present invention makes a substantially continuous operation possible, although a batch process may also be operated. The net result is to effect the reduction of zinciferous materials in an orderly, economical and efficient manner. Very little labor is required, and the agglomerates require no handling whatever. The force of gravity carries them through the preheating, cleaning, and reduction stages.

I claim:

1. The method of reducing zinciferous materials which comprises agglomerating a mixture of zinciferous material and carbonaceous reducing agent, conveying the freshly formed agglomerates without substantial drops or falls to a preheating chamber, preheating the agglomerates in the form of a porous charge at a temperature below the reduction point of the zinc compounds, conveying the preheated agglomerates in the form of a substantially continuous column by gravity to a reduction chamber, and supplying heat to the porous agglomerated charge in the course of its passage through said reduction chamber at a temperature level adapted to reduce the compounds of zinc and liberate metallic zinc vapor.

2. The method of reducing zinciferous materials which comprises agglomerating a mixture of zinciferous material and carbonaceous reducing agent, conveying the freshly formed agglomerates by gravity over an inclined screening device without substantial drops or falls to a vertically disposed preheating chamber, progressively passing the porous charge of agglomerates in the form of a substantially continuous column by the action of gravity through the chamber while preheating the charge at a temperature below the reduction point of the zinc compounds, conveying the preheated agglomerates by gravity over an inclined screening device without substantial drops or falls to an externally heated vertical retort, and progressively passing the porous charge of preheated agglomerates in the form of a substantially continuous column by the action of gravity through the vertical retort while heating the charge to a temperature level adapted to reduce the compounds of zinc and liberate metallic zinc vapor.

3. The method of reducing zinciferous materials which comprises agglomerating a mixture of zinciferous material and carbonaceous reducing agent, conveying the freshly formed agglomerates by the action of gravity over an inclined screening device without substantial drops or falls to a vertically disposed drying chamber, progressively passing the agglomerates in a substantially continuous column by gravity through the drying chamber while they are subjected to a drying operation, conveying the dried agglomerates by gravity over an inclined screening device to a vertically disposed coking chamber, progressively passing the dried agglomerates in a substantially continuous column by gravity through the coking chamber while they are subjected to a coking operation, conveying the coked agglomerates by gravity over an inclined screening device to an externally heated vertical retort, and progressively passing the porous charge of coked agglomerates in a substantially continuous column by gravity through the vertical retort while heating the charge to a temperature level adapted to reduce the compounds of zinc and liberate metallic zinc vapor.

4. The method of reducing zinciferous materials which comprises conveying the zinciferous material mixed with carbonaceous reducing agent in the form of a substantially continuous column of agglomerates by the action of gravity in a substantially straight line flow successively through a drying, a baking, a purifying, a coking and a reduction zone.

5. The method of reducing zinciferous material which comprises subjecting a porous agglomerated charge of the zinciferous material mixed with carbonaceous reducing agent in the form of a substantially continuous column to a preheating and a reduction operation, with at least one stage of screening, the charge being progressively moved through all the steps of the process by the action of gravity while the agglomerates are maintained in the form of a continuous column.

6. The method of reducing zinciferous material which comprises subjecting a porous agglomerated charge of zinciferous material mixed with carbonaceous reducing agent to a coking operation, and subjecting the coked agglomerates while hot and without contact with atmospheric oxygen to a reduction operation, said charge being progressed through the coking and reducing zones in the form of a substantially continuous column by the action of gravity.

7. An apparatus for reducing zinciferous material which comprises a press for forming an agglomerated charge of zinciferous material and carbonaceous reducing agent, a vertically disposed preheating chamber located at a level below the press, means associated with said press and preheating chamber for conveying the agglomerates from the press to the preheating chamber without substantial drops or falls, a vertically disposed reduction chamber located at a level below said preheating chamber, and means associated with said preheating and reduction chambers for conveying the hot agglomerates by gravity from the upper to the lower chamber.

8. An apparatus for reducing zinciferous materials which comprises a press for forming an agglomerated charge of zinciferous material and carbonaceous reducing agent, a vertically disposed drying chamber located at a level below the press, means associated with said press and drying chamber for conveying the agglomerates from the press to the drying chamber without substantial drops or falls, a vertically disposed coking chamber located at a level below said drying chamber, means associated with said drying and coking chambers for conveying the dried agglomerates by gravity from the upper to the lower chamber, a vertically disposed reduction chamber located at a level below said coking chamber, and means associated with said coking and reduction chambers for conveying the hot coked agglomerates by gravity from the upper to the lower chamber.

9. An apparatus for reducing zinciferous material which comprises a press for forming an agglomerated charge of zinciferous material and carbonaceous reducing agent, a vertically disposed drying chamber located at a level below the press means associated with said press and drying chamber for conveying the agglomerates from the press to the drying chamber without substantial drops or falls, a vertically disposed coking chamber located at a level below said drying chamber, means associated with said drying and coking chambers for conveying the dried agglomerates by gravity from the upper to the lower chamber, including an inclined screening device, a vertically disposed reduction chamber located at a level below said coking chamber, and means associated with said coking and reduction chambers for conveying the hot coked agglomerates by gravity from the upper to the lower chamber including an inclined screening device.

10. An apparatus for reducing zinciferous material which comprises a press for forming an agglomerated charge of zinciferous material and carbonaceous reducing agent, a vertically disposed drying chamber located at a level below the press, means associated with said press and drying chamber for conveying the agglomerates from the press to the drying chamber without substantial drops or falls, a vertically disposed coking chamber located at a level below said drying chamber, means associated with said drying and coking chambers for conveying the dried agglomerates by gravity from the upper to the lower chambers, a vertically disposed reduction chamber located at a level below said coking chamber, and means associated with said coking and reduction chambers for conveying the hot coked agglomerates by gravity from the upper to the lower chamber including an inclined and enclosed screening device.

11. An apparatus for reducing zinciferous material which comprises a press for forming an agglomerated charge of zinciferous material and carbonaceous reducing agent, a vertically disposed coking chamber located at a level below said press, means associated with said press and coking chamber for conveying the agglomerates for the most part by gravity from the press to the coking chamber, a vertically disposed reduction chamber located at a level below said coking chamber, and means associated with said coking and reduction chambers for conveying the hot coked agglomerates by gravity from the upper to the lower chamber.

12. The method of reducing zinciferous material in the form of agglomerates consisting of an intimate admixture of the zinciferous material and carbonaceous reducing agent, which comprises progressively moving a substantially continuous column of the agglomerates by gravity through an upright stationary preheating chamber in which the agglomerates are substantially uniformly heated, and then progressively moving the preheated agglomerates in a substantially continuous column by gravity through an upright reduction retort in which the agglomerates are substantially uniformly raised to their temperature of reduction.

13. The method of reducing zinciferous material according to claim 12, in which the agglomerates form a substantially continuous column through both the preheating chamber and the reduction chamber.

In testimony whereof I affix my signature.

EARL H. BUNCE.